(12) United States Patent
Wang et al.

(10) Patent No.: US 11,167,661 B2
(45) Date of Patent: Nov. 9, 2021

(54) BATTERY CELL REBALANCING METHOD

(71) Applicant: FORD GLOBAL TECHNOLOGIES, LLC, Dearborn, MI (US)

(72) Inventors: Rui Wang, Canton, MI (US); Xu Wang, Northville, MI (US); Xiao Guang Yang, Northville, MI (US); Yuan Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 16/589,898

(22) Filed: Oct. 1, 2019

(65) Prior Publication Data

US 2021/0094442 A1 Apr. 1, 2021

(51) Int. Cl.
*B60L 58/22* (2019.01)
*B60L 58/12* (2019.01)
*H01M 10/42* (2006.01)
*H02J 7/00* (2006.01)

(52) U.S. Cl.
CPC ............... *B60L 58/22* (2019.02); *B60L 58/12* (2019.02); *H01M 10/425* (2013.01); *H01M 10/4207* (2013.01); *H02J 7/0014* (2013.01); *H02J 7/0021* (2013.01); *H02J 7/0026* (2013.01); *B60L 2240/545* (2013.01); *H01M 2010/4271* (2013.01)

(58) Field of Classification Search
USPC ........................................................ 320/118
See application file for complete search history.

(56) References Cited

U.S. PATENT DOCUMENTS

| | | | |
|---|---|---|---|
| 9,463,710 B2 | 10/2016 | Kim | |
| 2006/0046104 A1* | 3/2006 | Zimmerman | H01M 10/482 429/7 |
| 2010/0308770 A1* | 12/2010 | Michalske | H02J 7/0013 320/116 |
| 2011/0163720 A1* | 7/2011 | Gonzales | B60L 58/12 320/116 |
| 2013/0030618 A1* | 1/2013 | Blakemore | B60L 53/14 701/22 |
| 2019/0148952 A1 | 5/2019 | Remboski et al. | |
| 2021/0094442 A1* | 4/2021 | Wang | H02J 7/0014 |

\* cited by examiner

*Primary Examiner* — Mohammed Alam
(74) *Attorney, Agent, or Firm* — David B Kelley; Brooks Kushman P.C.

(57) ABSTRACT

A vehicle includes an electric machine, a battery, and a controller. The electric machine is configured to deliver power to wheels to drive the vehicle. The battery has an array of cells that are configured to deliver electrical power to the electric machine. The controller is programmed to, in response to a charge imbalance within the array of cells, simultaneously discharge a number of cells within the array based on a temperature of the controller.

19 Claims, 3 Drawing Sheets

BATTERY CELL REBALANCING METHOD

TECHNICAL FIELD

The present disclosure relates to hybrid/electric vehicles and batteries for hybrid/electric vehicles.

BACKGROUND

Hybrid/electric vehicles may be propelled by an electric machine that draws power from a battery.

SUMMARY

A vehicle includes an electric machine, a battery, and a controller. The electric machine us configured to deliver power to wheels to drive the vehicle. The battery has an array of cells that are configured to deliver electrical power to the electric machine. The controller is programmed to, in response to a charge imbalance within the array of cells, determine a maximum number of cells within the array for simultaneous discharge to rebalance the charge based on a temperature of the controller and determine a first value for an upper charge threshold for the cells within the array of cells. The controller is further programmed to, in response to a first number of cells within the array having charges that exceed the first value and the first number being less than or equal to the maximum number, simultaneously discharge each cell of the first number of cells such that the charge of each cell of the first number of cells decreases to less than the first value. The controller is further programmed to, in response to the first number being greater than the maximum number, increase the upper charge threshold from the first value to a second value such that a second number of cells, that have charges that exceed the second value, is less than or equal to the maximum number of cells and simultaneously discharge each cell of the second number of cells such that the charge of each cell of the second number of cells decreases to less than the second value.

A vehicle includes an electric machine, a battery, and a controller. The electric machine is configured to deliver power to wheels to drive the vehicle. The battery has an array of cells that are configured to deliver electrical power to the electric machine. The controller is programmed to, in response to a charge imbalance within the array of cells, a first number of cells within the array having charges that exceed a first upper threshold, and the first number being less than or equal to a maximum number of cells for simultaneous discharge to rebalance the charge, simultaneously discharge each cell of the first number of cells such that the charge of each cell of the first number of cells decreases to less than the first upper threshold. The controller is further programmed to, in response to the charge imbalance within the array of cells, the first number of cells being greater than the maximum number, a second number of cells within the array having charges that exceed a second upper threshold, and the second number being less than or equal to the maximum number, simultaneously discharge each cell of the second number of cells such that the charge of each cell of the second number of cells decreases to less than the second upper threshold, wherein the second upper threshold is greater than the first upper threshold.

A method of rebalancing charge within an array of cells of a battery that is configured to provide electrical power to propel a vehicle includes receiving a maximum number of cells within the array for simultaneous discharge to rebalance the charge, wherein the maximum number is based on a temperature of a battery controller, receiving a minimum state of charge, wherein each cell of the array of cells has a charge that is greater than or equal to the minimum state of charge; receiving a first value for an upper charge threshold for the cells within the array of cells; discharging each cell of a first number of cells having charges that exceed the first value such that the charge of each cell of the first number of cells decreases to less than the first value in response to the first number being less than or equal to the maximum number; increasing the upper charge threshold from the first value to a second value such that a second number of cells, that have charges that exceed the second value, is less than or equal to the maximum number of cells in response to the first number being greater than the maximum number; and discharging each cell of a second number of cells such that the charge of each cell of the second number of cells decreases to less than the second value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
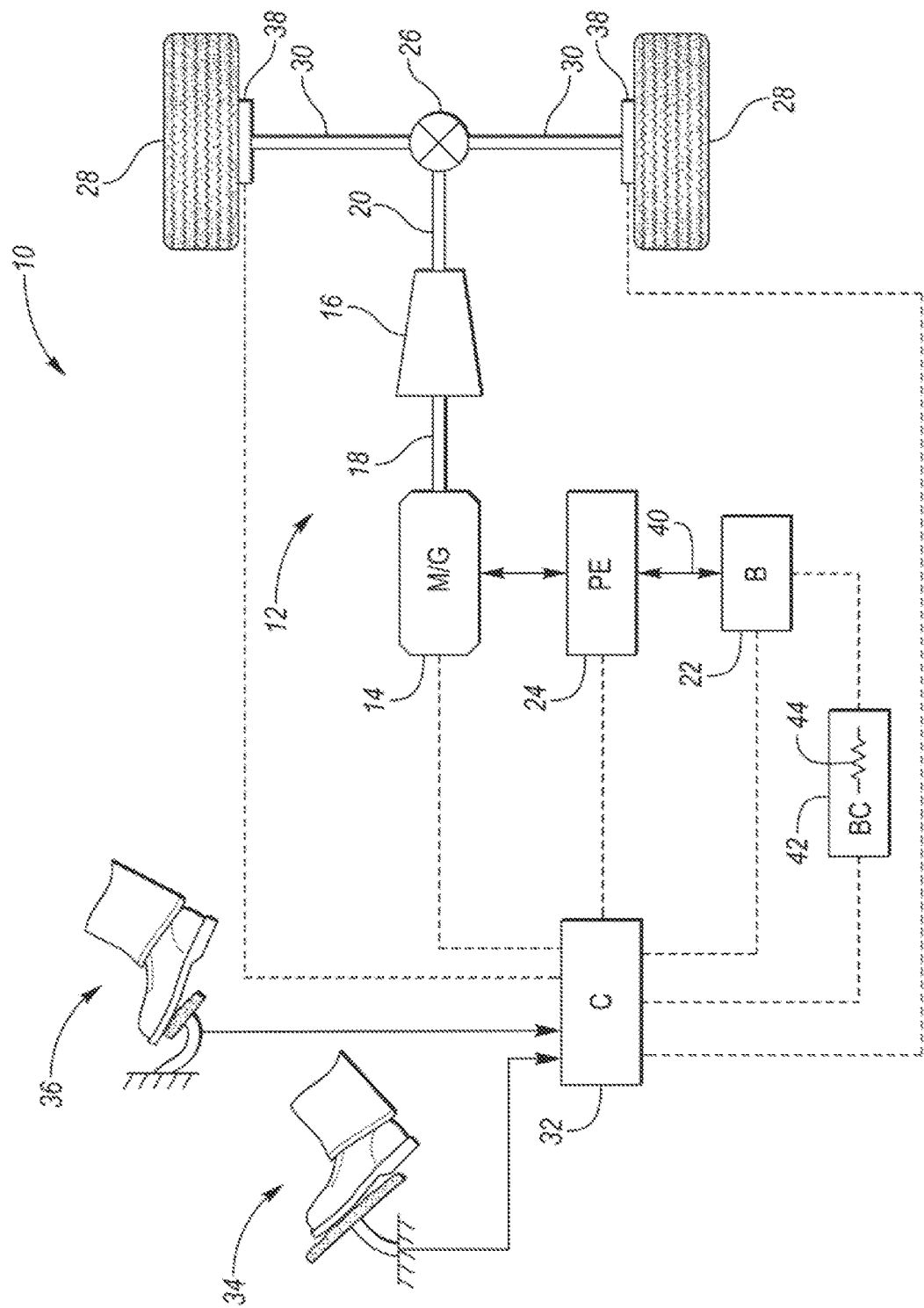
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shall 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The M/G 14 is configured to deliver power to the wheels 28 to drive the vehicle 28 via the various connections described above. It should be understood that the connections between the M/G 14 and the wheels 28 described herein is for illustrative purposes only and that other drivetrain configurations between the M/G 14 and the wheels 28 may be implemented in the alternative.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (LO) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the MG 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the IO interface may be used to indicate wheel speeds (WS1, WS2), vehicle speed (VSS), coolant temperature (ECT), accelerator pedal position (PPS), ignition switch position (GN), ambient air temperature (e.g., ambient air temperature sensor), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle may specifically include a sub-controller that is configured to control charging and discharging of the battery 22. The sub-controller may be referred to as a battery system controller 42. The battery system controller 42 may be a subcomponent of controller 32 or may be a separate component from controller 32. The battery 22 includes an array of cells that are configured to delivery power to and receive power from the M/G 14. The battery system controller 42 may include one or more battery monitoring integrated circuits (BMICs) that are configured to control (e.g., charging and discharging) specific subsets of cells or specific banks of cells within the array of cells. The battery system controller 42 includes one or more resistors 44 that are configured to dissipate electrical energy from the array of cells during charge rebalancing within the array of cells. More specifically, the one or more resistors 44 may be configured to dissipate electrical energy from specific individual cells within the array of cells of the battery 22. More specifically, each BMIC may include specific resistors 44 that are configured to dissipate electrical energy from the specific subsets of cells or specific banks of cells within the array of cells that each BM IC controls.

Charge balancing or charge rebalancing includes dissipating electrical energy from individual cells within the array of cells of the battery 22 in order to bring the charges of each individual cell to within a desired range where the deviation in charge between individual cells is minimized. For example, after rebalancing each cell may have a state of charge that is at least a minimum charge value or a charge that is at most 0.5% greater than the minimum charge value. An imbalance within the battery occurs when individual cells have charges that are greater than a threshold over the minimum charge value. A rebalancing operation includes discharging the individual cells that have charges that are greater than the threshold over the minimum charge value until the charge value of each individual cells is within the desired range (e.g., between the minimum charge value and 0.5% greater than the minimum charge value). During rebalancing, the individual cells within the battery 22 are discharged by directing electrical energy from the individual cells to the one or more resistors 44. This may result in an increase in the temperature of the battery system controller 42 or in the temperature of the individual BMICs due to the heat generated by the one or more resistors 44.

As the battery 22 ages, the charge capacities of the individual cells within the battery 22 may decrease at various rates to various levels resulting in greater charge imbalances within the individual cells of the battery 22 when compared to charge imbalances within the battery 22 at the beginning of the operating life of the battery 22. Greater charge imbalances may increase the workload of the one or more resistors 44 resulting in greater heat generation within the battery system controller 42 and/or the individual BMICs. Therefore, it may be advantageous to include a system that monitors the temperature of the battery system controller 42 and/or the individual BMICs and adjusts any rebalancing operation to prevent overheating of the battery system controller 42 and/or the individual BMICs. One or more temperature sensors may be configured to determine the temperature of the battery system controller 42 and/or the individual BMICs. The one or more temperature sensors may then be configured to communicate the temperature of the battery system controller 42 and/or the individual BMICs to the battery system controller 42 or any other controller in the vehicle 10.

Figure 2:
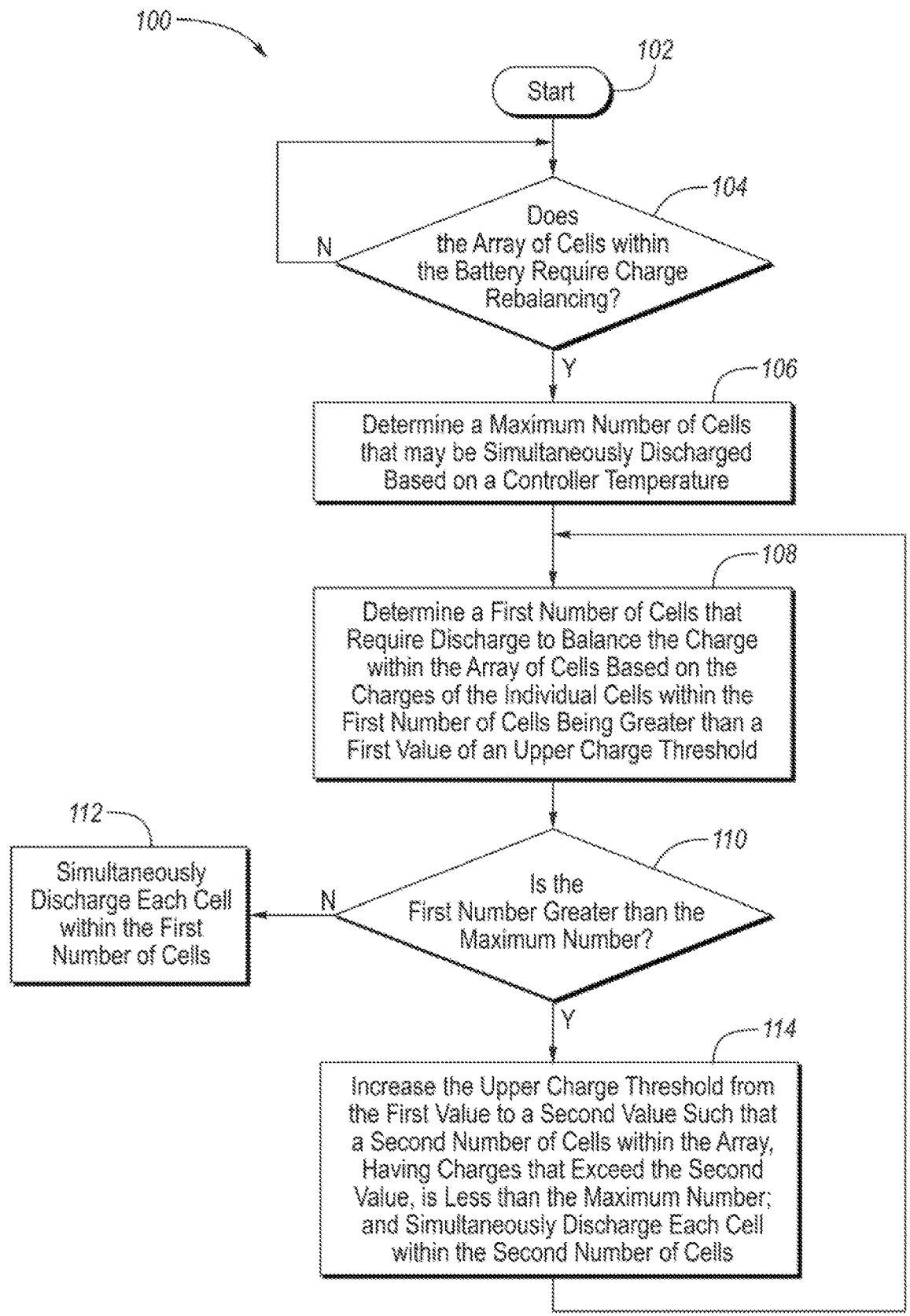
FIG. 2 is flowchart illustrating a method of rebalancing charge within an array of cells of a battery that is configured to deliver electrical power to an electric machine to propel the vehicle.

Referring to FIG. 2, a flowchart of a method 100 of rebalancing charge within the array of cells of the battery 22 is illustrated. The method 100 may be implemented to prevent overheating of battery system controller 42 and/or the individual BMICs. The method 100 may be stored as control logic and/or an algorithm within the battery system controller 42. The battery system controller 42 may implement the method 100 by controlling the various components of the vehicle 10.

The method 100 begins at start block 102. More specifically, the method 100 may begin at start block 102 once the battery system controller 42 has been powered on. The battery system controller 42 may be configured to initiate and cycle through the method 100 at regular intervals once the ignition of the vehicle 10 has been turned on. Next, the method 100 moves on to block 104 where it is determined if the array of cells within the battery 22 require charge rebalancing. The battery system controller 42 may include control logic and/or circuitry that is configured to observe the charge of the individual cells within the battery. Charge rebalancing is required if there is an imbalance within the battery 22 due to individual cells within the array of cells having charges that are greater than a threshold over a minimum charge value. The minimum charge value may correspond to a lowest state of charge observed and/or received by the battery system controller 42 of an individual cell prior to a rebalancing operation. The battery system controller 42 may then define the observed or received minimum state of charge as the minimum state of charge that will utilized to determine to what level the individual cells of the array of cells of the battery 22 will be dissipated to during the rebalancing operation. It should be noted that prior to the rebalancing operation each cell within the array of cells will have a charge value that is greater than or equal to the minimum state of charge value. If the array of cells within the battery 22 do not require charge rebalancing, the method 100 recycles back to the beginning of block 104. If the army of cells within the battery 22 do require charge rebalancing, the method 100 moves on to block 106.

At block 106, the method 100 determines a maximum number of cells within the array of cells of the battery 22 that may be simultaneously discharged based on a temperature of the battery system controller 42. A temperature sensor may communicate the temperature of the battery system controller 42 to the battery system controller 42 or any other controller in the vehicle 10. Block 106 is meant to limit the number of cells within the array of cells of the battery 22 that may be simultaneously discharged during a rebalancing operation based on the temperature of the battery system controller 42 in order to prevent overheating of the battery system controller 42. The function or control logic implemented at block 106 decreases the maximum number of cells that may be simultaneously discharged during a rebalancing operation in response to an increase in the temperature of the battery system controller 42 and increases the maximum number of cells that may be simultaneously discharged during a rebalancing operation in response to a decrease in the temperature of the battery system controller 42. The function implemented at block 106 may be a linear function, an exponential function, a step function, or any other suitable type of function.

After block 106, the method 100 moves on to block 108. At block 108, the method 100 determines a first number of cells that require discharge to balance the charge within the array of cells of the battery 22 based on the charges of the individual cells within the first number of cells being greater than a first value of an upper charge threshold, which is greater than the minimum charge value. Also, at block 108 the first value of the upper charge threshold may be determined. The first value may be a preset value that preselected based on maintaining all of the charges of the cells of the array of cells of the battery 22 within a desired range (e.g., between the minimum charge value and 0.5% greater than the minimum charge value) while also allowing some hysteresis to prevent the battery system controller 42 from constantly performing rebalancing operations. For example, if the rebalancing operation adjusts the charges of each cell of the array of cells of the battery 22 to within a range between the minimum charge value and 0.5% greater than the minimum charge value, the first value of the upper threshold may have a value that ranges between 1.5% greater than the minimum charge value and 5% greater than the minimum charge value.

Next, the method 100 moves on to block 110 where it is determined if the first number of cells, that have a charge value that is greater than the first value of the upper charge threshold and require discharge to balance the charge within the array of cells, is greater than the maximum number of cells that may be simultaneously discharged during a rebalancing operation. If the first number of cells is not greater than the maximum number of cells, the method 100 moves on to block 112 where each cell of the first number of cells is simultaneously discharged such that the charge of each cell within the first number of cells decreases to less than the first value of the upper threshold. More specifically, each cell within the first number of cells may be simultaneously discharged such that the charge of the individual cells is within the desired range which is less than the first value of the upper threshold after accounting for any hysteresis value. For example, if the first value of the upper threshold is 1.5% greater than the minimum charge, the individual cells within the first number of cells may be simultaneously discharged until they have a charge within a desired range between the minimum charge value and 0.5% greater than the minimum charge value.

Alternatively, each cell within the first number of cells may be simultaneously discharged to a specific endpoint charge that is less than the first value of the upper threshold but greater than the minimum charge. For example, if the first value of the upper threshold is 1.5% greater than the minimum charge, the individual cells within the first number of cells may be simultaneously discharged during a rebalancing operation until each cell obtains a specific endpoint charge value of 0.5% greater than the minimum charge value.

Returning to block 110, if it is determined that the first number of cells is greater than the maximum number of cells, the method 100 moves on to block 114 where the upper charge threshold is increased from the first value to a second value such that a second number of cells, that have charges that exceed the second value, is less than or equal to the maximum number of cells that may be simultaneously discharged during a rebalancing operation. Alternatively, it could be stated that the first value is a first upper threshold and that the second value is a second upper threshold, where the second upper threshold is greater than the first upper threshold. Also, at block 114 each cell of the second number of cells is simultaneously discharged such that the charge of each cell within the second number of cells decreases to less than the second value of the upper threshold. More specifically, each cell within the second number of cells may be simultaneously discharged such that the charge of the individual cells is within the desired range which is less than the second value of the upper threshold after accounting for any hysteresis value. For example, if the second value of the upper threshold is 4% greater than the minimum charge, the individual cells within the second number of cells may be simultaneously discharged until they have a charge within a desired range between the minimum charge value and 2.5% greater than the minimum charge value. The method 100 may then recycle back to block 108 once the second number of cells has been discharged at block 114.

Alternatively, each cell within the second number of cells may be simultaneously discharged to a specific endpoint charge that is less than the second value of the upper threshold but greater than the minimum charge. For example, if the second value of the upper threshold is 4% greater than the minimum charge, the individual cells within the second number of cells may be simultaneously discharged until each cell obtains a specific endpoint charge value of 2.5% greater than the minimum charge value. If the method 100 operates according to this alternative embodiment, the specific endpoint charge that each cell of the second number of cells is discharged to may be increased at block 114 relative to the specific endpoint charge that each cell of the first number of cells is discharged to at block 112. For example, if the method 100 is set to discharge each cell to a specific endpoint charge value of 0.5% greater than the minimum charge value during rebalancing at block 112, the method 100 may increase the endpoint charge value to a value that is equal to or greater than 0.5% greater than the minimum charge value at block 114.

The upper threshold and the specific endpoint discharge points may be clipped such that the method 100 does not increase the values beyond a specific range. For, example, the first value of the upper threshold may have a value that is at least 1.5% greater than the minimum charge while the second value of the upper threshold may have a value that is at most 5% greater than the minimum charge. Therefore, under such a scenario, the method 100 will ensure that the upper threshold remains within a range between 1.5% greater than the minimum charge and 5% greater than the minimum charge. As another example, the method 100 may discharge the first number of cells at block 112 to an endpoint value between the minimum charge value and 0.5% greater than the minimum charge value, and may discharge the second number of cells at block 114 to an endpoint value between the minimum charge value and 3% greater than the minimum charge value. Therefore, under such a scenario, the method 100 will ensure that the cells are discharged to within a range between the minimum charge value and 3% greater than the minimum charge value during rebalancing.

It should be understood that the flowchart in FIG. 2 is for illustrative purposes only and that the method 100 should not be construed as limited to the flowchart in FIG. 2. Some of the steps of the method 100 may be rearranged while others may be omitted entirely. Furthermore, the method 100 may be applied to rebalance one or more subsets or banks of cells within the array of cells of the battery 22, where the subsets or banks of cell are controlled by individual BMICs that have dissipating resistors. More specifically, the method 100 may define the maximum number of cells within each subset or bank of cells that may be discharged simultaneously based on the temperatures of the individual BMICs controlling each subset or bank of cells.

Figure 3:
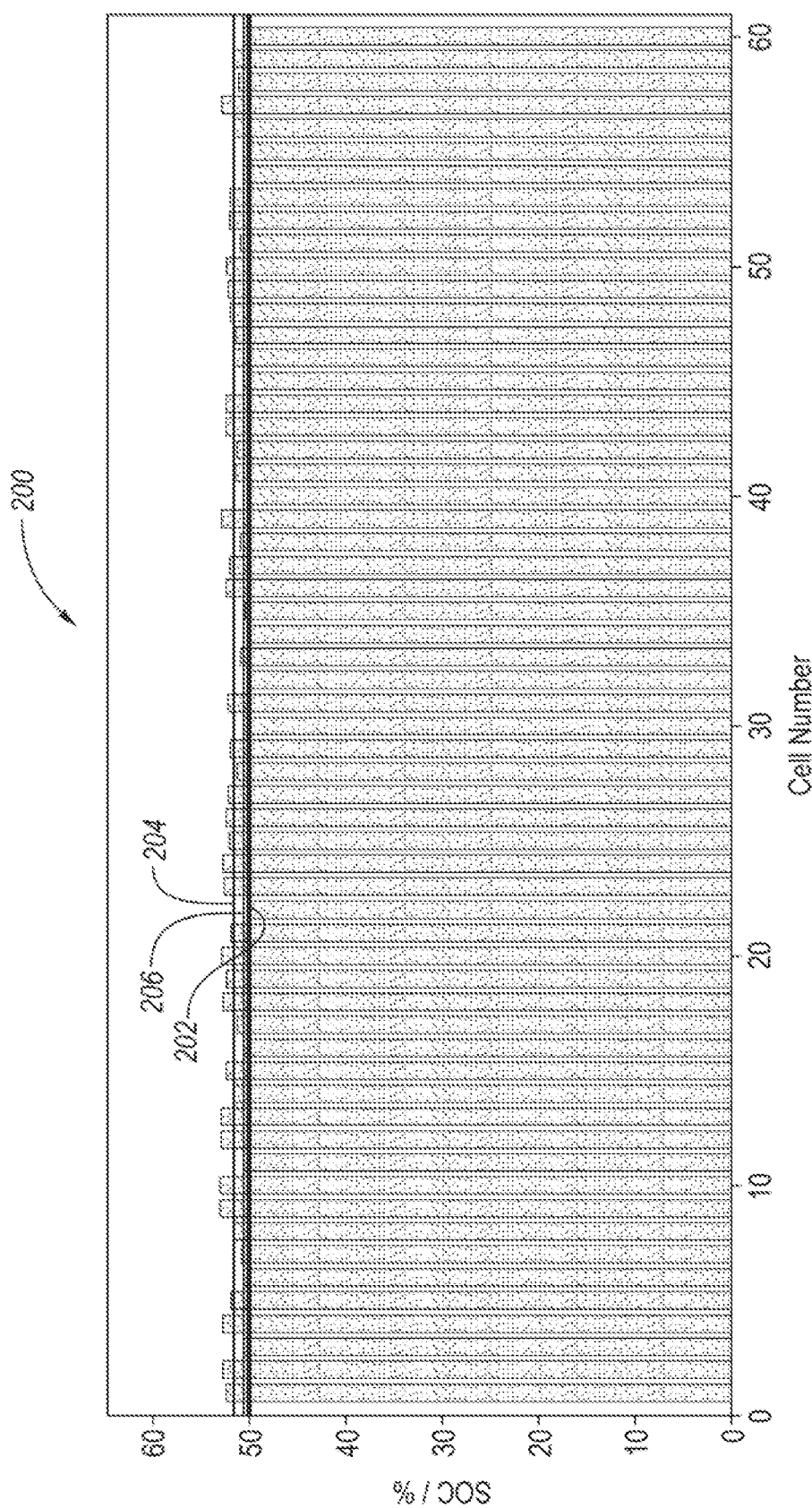
FIG. 3 is a graph illustrating a charge imbalance within the array of cells of the battery.

Referring to FIG. 3, a graph 200 of a charge imbalance within the array of cells of the battery 22 is illustrated. The graph 200 is a bar graph that illustrates the charges of the individual cells. The specific cells are identified by a cell number which is shown as the vertical axis. The state of charge of the cells is illustrated as the vertical axis. The graph 200 includes a first line 202 that represents the minimum charge, a second line 204 that represents the upper threshold, and a third line 206 that represents an endpoint charge as described above. According to method 100, as long as the number of cells that requires discharging (i.e., the number of cells having a value that is greater than line 204) is less than or equal to the maximum number of cells within the array of cells of the battery 22 that may be simultaneously discharged based on a temperature of the battery system controller 42, the cells illustrated in graph 200 may be discharged simultaneously until they reach the endpoint charge value (i.e., line 206) during a cell charge rebalancing operation. On the other hand, if the number of cells that requires discharging is greater than the maximum number of cells within the array of cells of the battery 22 that may be simultaneously discharged based on a temperature of the battery system controller 42, the upper threshold (i.e., line 204) and possibly the endpoint charge value (i.e., line 206) may be increased until the number of cells that requires discharging is less than or equal to the maximum number of cells within the array of cells of the battery 22 that may be simultaneously discharged.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to deliver power to wheels to drive the vehicle;

a battery having an array of cells configured to deliver electrical power to the electric machine; and a controller programmed to, in response to a charge imbalance within the array of cells, determine a maximum number of cells within the array for simultaneous discharge to rebalance the charge based on a temperature of the controller and determine a first value for an upper charge threshold for the cells within the array of cells, in response to a first number of cells within the array having charges that exceed the first value and the first number being less than or equal to the maximum number, simultaneously discharge each cell of the first number of cells such that the charge of each cell of the first number of cells decreases to less than the first value, in response to the first number being greater than the maximum number, increase the upper charge threshold from the first value to a second value such that a second number of cells, that have charges that exceed the second value, is less than or equal to the maximum number of cells and simultaneously discharge each cell of the second number of cells such that the charge of each cell of the second number of cells decreases to less than the second value, and in response to an increase in the temperature of the controller, decrease the maximum number of cells that may be simultaneously discharged to rebalance the charge.

2. The vehicle of claim 1, wherein the controller further comprises resistors that are configured to dissipate electrical energy from the array of cells during rebalancing.

3. The vehicle of claim 1, wherein the controller is programmed to, in response to the charge imbalance within the array of cells, define a minimum state of charge, wherein each cell of the array of cells has a charge that is greater than or equal to the minimum state of charge.

4. The vehicle of claim 3, wherein the controller is programmed to, in response to simultaneously discharging each cell of the first number of cells, decrease the charge of each cell of the first number of cells to a charge value that ranges between the minimum state of charge and 0.5% greater than the minimum state of charge.

5. The vehicle of claim 3, wherein the controller is programmed to, in response to simultaneously discharging each cell of the second number of cells, decrease the charge of each cell of the second number of cells to a charge value that ranges between the minimum state of charge and 3% greater than the minimum state of charge.

6. The vehicle of claim 3, wherein the first value is at least 1.5% greater than the minimum state of charge.

7. The vehicle of claim 3, wherein the second value is at most 5% greater than the minimum state of charge.

8. A vehicle comprising:

an electric machine configured to deliver power to wheels to drive the vehicle;

a battery having an array of cells configured to deliver electrical power to the electric machine;

a controller programmed to, in response to a charge imbalance within the array of cells, a first number of cells within the array having charges that exceed a first upper threshold, and the first number being less than or equal to a maximum number of cells for simultaneous discharge to rebalance the charge, simultaneously discharge each cell of the first number of cells such that the charge of each cell of the first number of cells decreases to less than the first upper threshold, and in response to the charge imbalance within the array of cells, the first number of cells being greater than the maximum number, a second number of cells within the array having charges that exceed a second upper threshold, and the second number being less than or equal to the maximum number, simultaneously discharge each cell of the second number of cells such that the charge of each cell of the second number of cells decreases to less than the second upper threshold, wherein the second upper threshold is greater than the first upper threshold; and resistors that are configured to dissipate electrical energy from the array of cells during rebalancing.

9. The vehicle of claim 8, wherein the controller is further programmed to, in response to an increase in a temperature of the controller, decrease the maximum number of cells that may be simultaneously discharged to rebalance the charge.

10. The vehicle of claim 8, wherein the controller is further programmed to, in response to a decrease in a temperature of the controller, increase the maximum number of cells that may be simultaneously discharged to rebalance the charge.

11. The vehicle of claim 8, wherein the controller is programmed to, in response to simultaneously discharging each cell of the first number of cells, decrease the charge of each cell of the first number of cells to a charge value that ranges between a minimum state of charge and 0.5% greater than the minimum state of charge, wherein each cell of the array of cells has a charge that is greater than or equal to the minimum state of charge.

12. The vehicle of claim 8, wherein the controller is programmed to, in response to simultaneously discharging each cell of the second number of cells, decrease the charge of each cell of the second number of cells to a charge value that ranges between a minimum state of charge and 3% greater than the minimum state of charge, wherein each cell of the array of cells has a charge that is greater than or equal to the minimum state of charge.

13. The vehicle of claim 8, wherein the first upper threshold is at least 1.5% greater than the minimum state of charge.

14. The vehicle of claim 8, wherein the second upper threshold is at most 5% greater than the minimum state of charge.

15. A method of rebalancing charge within an array of cells of a battery that is configured to provide electrical power to propel a vehicle comprising:

receiving a maximum number of cells within the array for simultaneous discharge to rebalance the charge, wherein the maximum number is based on a temperature of a battery controller;

receiving a minimum state of charge, wherein each cell of the array of cells has a charge that is greater than or equal to the minimum state of charge;

receiving a first value for an upper charge threshold for the cells within the array of cells;

discharging each cell of a first number of cells having charges that exceed the first value such that the charge of each cell of the first number of cells decreases to less than the first value in response to the first number being less than or equal to the maximum number;

increasing the upper charge threshold from the first value to a second value such that a second number of cells, that have charges that exceed the second value, is less than or equal to the maximum number of cells in response to the first number being greater than the maximum number;

discharging each cell of a second number of cells such that the charge of each cell of the second number of cells decreases to less than the second value; and increasing the maximum number of cells that may be simultaneously discharged to rebalance the charge in response to a decrease in the temperature of the controller.

16. The method of claim 15 further comprising:

decreasing the maximum number of cells that may be simultaneously discharged to rebalance the charge in response to an increase in the temperature of the controller.

17. The method of claim 15, wherein the first value is at least 1.5% greater than the minimum state of charge.

18. The method of claim 15, wherein the second value is at most 5% greater than the minimum state of charge.

19. The method of claim 15, wherein the first and second number of cells are discharged via resistors.

\* \* \* \* \*